J. F. CARY.
BROODER.
APPLICATION FILED OCT. 4, 1913.
1,149,808.
Patented Aug. 10, 1915.
2 SHEETS—SHEET 1.
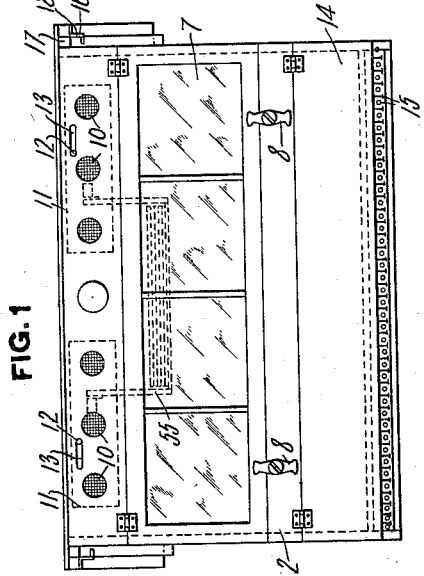
WITNESSES
INVENTOR
John F. Cary.
By Fredk H. Winter,
Attorney.

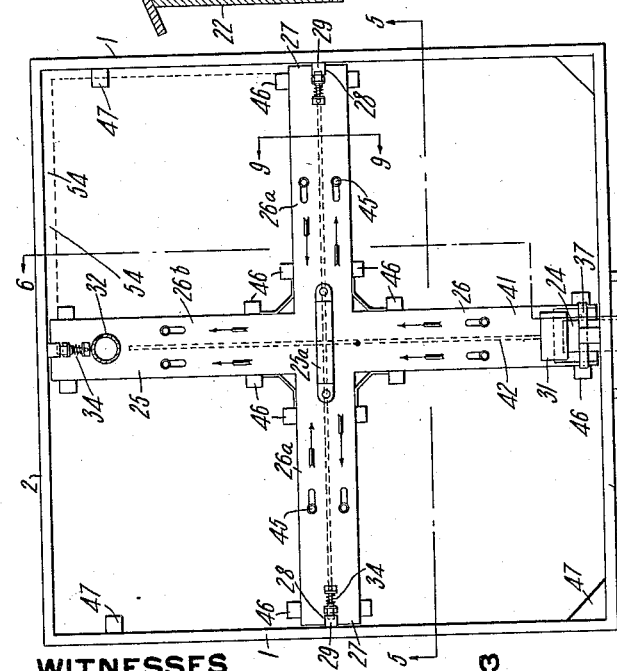

UNITED STATES PATENT OFFICE.

JOHN FRANKLIN CARY, OF McCANDLESS TOWNSHIP, ALLEGHENY COUNTY, PENNSYLVANIA.

BROODER.

1,149,808.  Specification of Letters Patent.  Patented Aug. 10, 1915.

Application filed October 4, 1913. Serial No. 793,314.

*To all whom it may concern:*

Be it known that I, JOHN FRANKLIN CARY, a resident of McCandless township, in the county of Allegheny and State of Pennsylvania, have invented a new and useful Improvement in Brooders, of which the following is a specification.

This invention relates to brooders, and particularly to means for heating and ventilating the same, conserving the animal heat of the birds and protecting them from enemies.

The object of the invention is to provide an improved brooder having combined heating and ventilating means arranged to prevent the chicks from crowding or injuring each other and to keep them warm without burning, and which means embodies a member which is adjustable to two positions, in one of which it acts as a ventilator and as a partition wall for dividing the chicks into groups, and in the other position as a heater or radiator.

Another object of the invention is to provide an improved hover for conserving the animal heat.

The invention comprises the construction and arrangement of parts hereinafter described and claimed.

In the drawings, Figure 1 represents a front elevation of a brooder embodying the invention; Fig. 2 is a side elevation thereof, partly in section; Fig. 3 is a plan view of the same with the cover removed, and omitting the upper end of the smokestack and showing one hover in place; Fig. 4 is a detail longitudinal sectional elevation, showing the movable conduit acting as a radiator; Fig. 5 is a cross sectional elevation on the line 5—5, Fig. 3; Fig. 6 is a broken out longitudinal section on the line 6—6, Fig. 3; Fig. 7 is a plan view of a hover; Fig. 8 is a side elevation thereof; Fig. 9 is a detail cross section on the line 9—9, Fig. 3; and Fig. 10 is a similar cross section on the line 10—10, Fig. 6.

The brooder shown in the drawings comprises a casing having side walls 1, a front wall 2, and a rear wall 3, said walls being formed either of metal or wood, and shown as of wood. The brooder may rest directly upon the ground, in which case the ground forms its bottom, but it preferably has a bottom 4 and a false bottom 5 thereabove, to provide an air space 6 for keeping the brooder floor dry. The front wall 2 has hinged thereto a window 7 which may be locked by suitable catches 8, and which may be raised for ventilation. The opening covered by said window is preferably also covered by a screen 9, to keep out rats or other animals. Above the window the front wall is provided with a plurality of screened openings 10 which may be opened or closed by sliding shutters 11 operated by handles 12 projecting out through slots 13 in the wall. Said openings may be opened for ventilation when the weather is too severe to permit the large window to be raised. Below the window 7 is a door 14, hinged on a horizontal axis and having its lower edge exposed and extending slightly below the floor level. A row of projections 15, preferably steel pins, is driven into the exposed lower edge of said door, and a second row of similar pins is driven into the front wall 2 just below said door, so that when the latter is closed the two rows of pins are interlocked in staggered relation as shown in Fig. 1. The projecting pins prevent mice or rats from gnawing their way into the brooder.

The side walls 1 of the casing have sloping upper edges, and the front wall 2 is higher than the rear wall 3, so that the roof or cover slopes from front to rear, as shown in Fig. 2. Said roof is provided at its side edges with hooks or clips 16 embracing ribs or runways 17 secured to the side walls. The roof is slidable along the runways 17, and may be moved rearwardly to the position shown in dotted lines, Fig. 2, to permit access to the brooder for manipulating the combined ventilator and radiator or the hovers and handling the chicks. Preferably, two stops 18 are secured to one or both of the side walls 1 in position to be contacted by one of the hooks 16 in open and closed positions of the cover.

A wing 20 extends outwardly from the rear wall 3 of the brooder and forms a chamber for holding the lamp or heater 21. One of the walls of said wing, such as the rear wall 22, may be hinged to form a door through which the lamp or heater may be inserted or manipulated when desired, and which is provided with one or more openings 22ª admitting air to the heating chamber. The chimney 23 of the heater bends laterally into a horizontal plane and projects through the rear wall and into the brooder, as at 24.

Within the brooder is located a combined heating and ventilating member 25 which may be of any suitable shape, depending upon the size and proportions of the particular brooder. As shown in the drawings said member in plan view is shaped like a cross having a rear arm 26, two side arms 26ª and a front arm 26ᵇ, each of which is hollow and is formed of a U-shaped sheet metal bottom member 40 having a top cover plate 41 suitably secured thereto, such as by beading, riveting or soldering their edges together. A vertical longitudinal partition 42 is located within each of said arms. These partitions, however, stop short of the outer ends of the arms, but join where they intersect. The outer ends of the arms 26ª and 26ᵇ are closed by walls 27, which are bent or shaped to form channels 28 to receive vertical ribs or guides 29 on the side walls of the frame. The outer end portion of arm 26 is rectangular in cross section, as shown in Fig. 10, and its cover plate stops short of the end of the arm to permit it to pass pipe 23 in lowering the member 25 to its lowest position. The side walls of arm 26 are provided with inclined guides 30 for sliding door 31, the lower edge of which rests on the upper surface of the rectangular end portion 24 of pipe 23 when the heater is up, as in Fig. 6, and on the flat bottom of arm 26 when the heater is down, as in Fig. 2. In both positions of member 25 the end of arm 26 is closed by the plate or door 31. The outer end of arm 26ᵇ is provided with an upstanding tubular member 32, which telescopes into the lower end of the tubular smokestack 33, which is suitably secured to and passes through the front wall 2 of the frame, and has its outer end open to the atmosphere.

Each of the arms 26ª and 26ᵇ is provided on its upper face with a suitable spring catch 34, whose beveled end 35 engages a socket 36 on the guide 29 to support the heater when raised. Above one or more of the arms, such as the rear arm 26, is located a stop 37, which is secured to a wall of the casing and prevents the member 25 from being lifted too far. Member 25 is preferably provided with a lifting bail or handle 25ª, as shown in Fig. 3. The member 25 is lifted to its uppermost position in the day time or when it is desired to allow the chicks to exercise. The sliding door 31 is moved to close the end of rear arm 26 and the lamp or heater 21 is started. The heated air and gases of combustion pass through the lamp chimney 23 and enter the rear arm 26, half of the air and gases passing through each of the passages 38 on opposite sides of the partition wall 42. The gases follow the course indicated by the arrows in Fig. 3, traveling outwardly in the two side arms 26ª, around the ends of the partition walls therein and back to the front arm 26ᵇ, through which they pass to the pipe 32 and thence to the smokestack 33 and out to the open air. The member 25 in this case is supported at a level high enough to prevent the chicks from touching the same, so they are not liable to be burned, and moreover, cannot find the source of heat so that they do not mass or crowd together and injure themselves.

At night it is unnecessary to supply heat to the brooder, since by arranging the heating and ventilating member 25 as hereinbefore described and covering the chicks with hovers, they generate sufficient animal heat to keep warm. The lamp or heater 21 is turned off, the sliding door 31 is moved back, the catches 34 are pressed back, and member 25 is lowered until it rests on the floor of the brooder. The arms of said member are all provided along the upper edges of their side walls with rows of ventilating openings 43. Within the passages 38 in said arms are located movable shutters or plates 44, having handles or knobs 45 extending out through longitudinal slots in said arms. Said shutters are provided with openings, and by moving the plates longitudinally in the arms the openings 43 may be opened or closed as desired. In the upper position of the member 25, when it acts as a heater or radiator, said openings are closed. In the lower position of said member, when it acts as a ventilator, the plates are moved to open the ventilating openings. Door 31 is also dropped to the bottom of arm 26, as shown in Fig. 2. The side walls of the arms of member 25 are also provided with lugs or projections 46, and fixed lugs 47 are located upon the inner surface of the walls of the casing for coöperation therewith. Member 25 being lowered to position on the floor of the brooder, the chicks are divided into four groups or divisions, one in each of the four compartments of the brooder. Each group of chicks is then covered with a hover 50, comprising a rectangular frame 51 which rests loosely on the lugs 46, 47, and which is provided with corner springs or clips 52 to detachably hold the corners of a web 53 of suitable textile fabric, such as an ordinary flannel blanket. This web hangs loosely from the hover and the chicks crowd under the same, as will be readily understood. The web 53 can be easily slipped out from the clips 52 for washing or disinfecting. Each hover, in one direction, is shorter than the compartment in which it is placed, so that an open space 54 is left between the edge of the hover and the inner wall of the casing. Fresh air now enters the casing through the openings 22ª in the wing 22 and travels up through the chimney 23 of the heater and downwardly around the outside edges of the hover through the spaces 54 and then underneath the webs 53 of the hovers, carrying with it the heat and foul air and gases generated by the chicks, which pass through the ventilating openings 43 into member 25, and thence along the passages therein to the outer end of member 26$^b$, and from thence through the pipe 32 and stack 33 to the open air.

Racks 55 are preferably secured to the under side of the roof or cover 13, in which the hovers 50 may be stacked when not in use, as shown in dotted lines, Fig. 2. During the daytime, when the hovers are not in use and member 25 acts as a radiator, the hovers are kept warm and dry ready for use in the evening.

The brooder described is of simple construction, can be cheaply manufactured and readily manipulated. The member 25 acts both as a heater or radiator and as a ventilator member. When in its lowermost position it also acts as a fence or division wall separating the chicks into groups or divisions so there is less danger of overcrowding, and also as a support for the hover frames.

What I claim is:

1. A brooder, comprising a casing having an opening for admitting heated air or gas thereinto, a hollow member adapted to occupy two positions within said casing, said member in one of said positions communicating with said opening, and a conduit leading from said member to the atmosphere in both of said positions.

2. A brooder, comprising a casing having an opening above its bottom, a hollow heating and ventilating member therein adapted to occupy two positions, said member in one position resting on the bottom of the casing, and in its other position communicating with said opening, and a conduit permanently connected to said member opening to the atmosphere therefrom.

3. A brooder, comprising a casing having an opening above its bottom, a hollow heating ventilating member adapted to occupy two positions therein, said member in one position resting on the bottom of the casing and in its other position communicating with said opening, and a telescoping conduit arranged to open communication from said member to the atmosphere in both of said positions.

4. A brooder, comprising a casing having an opening above its bottom, a hollow member movable vertically therein and in its lowest position resting on the bottom of the brooder, said member in its upper position communicating with said opening, and a vertically disposed telescoping conduit leading from said member to the atmosphere.

5. A brooder, comprising a casing having an opening above its bottom, a hollow member movable vertically therein and in its lowest position resting on the bottom of the brooder, means for supporting said member above the bottom of the brooder and in communication with said opening, a conduit leading from one end of said member to the atmosphere, and means for closing the other end of said member when lowered.

6. A brooder, comprising a casing having an opening above its bottom, a hollow member therein adapted to rest on the bottom of the brooder or above said bottom in communication with said opening, means for supporting said member in said second named position, and a telescoping conduit leading from said member to the atmosphere.

7. A brooder, comprising a casing having an opening above its bottom, a hollow member movable vertically in said casing, vertical guides for said member, said member in its lowest position resting on the bottom of the brooder and in its upper position being in communication with said opening, and means opening communication from said member to the atmosphere in both of said positions.

8. A brooder, comprising a casing having an opening above its bottom, a hollow member movable vertically therein, vertical guides for said member, a stop arranged to be contacted by said member for limiting upward movement thereof, said member in its lowest position resting on the bottom of the brooder and in its upper position communicating with said opening, and means opening communication from said member to the atmosphere.

9. A brooder, comprising a casing having an opening above its bottom, a hollow member movable vertically therein and adapted to rest on the bottom of the brooder or to occupy a position above the bottom thereof and in communication with said opening, said member being provided with ventilating openings, and a conduit arranged to open communication from said member to the atmosphere in both of said positions.

10. A brooder, comprising a casing having an opening above its bottom, a hollow member movable vertically therein and adapted to rest on the bottom of the brooder or to occupy a position above the bottom thereof and in communication with said opening, said member being provided with ventilating openings, and means for opening and closing said openings.

11. A brooder, comprising a casing having an opening above its bottom, a hollow member movable vertically therein and in its lowest position resting on the bottom thereof, said member in its upper position being in communication with said opening, said member being provided with ventilating openings, and a vertically disposed telescoping conduit leading from said member to the atmosphere in both positions thereof.

12. A brooder, comprising a casing having an opening above its bottom, a hollow member movable vertically therein and in its lowest position resting on the bottom thereof, said member in its upper position being in communication with said opening, said member being provided with ventilating openings, and means for opening and closing said ventilating openings.

13. A brooder, comprising a casing having an opening above its bottom, a hollow member movable vertically therein and adapted to rest upon the bottom of the brooder or to occupy a position above said bottom and in communication with said opening, said member being provided with side lugs, coöperating lugs on the casing wall, removable hovers adapted to rest on said lugs when the member is in its lowest position, and a conduit opening communication between said member and the atmosphere.

14. A brooder, comprising a casing having an opening above its bottom, a heating and ventilating member movable vertically in said casing, said member having horizontally disposed diverging arms, said arms forming conduits for heated air or gas when the member is in its uppermost position and in communication with said opening, said arms being provided with ventilating openings, and a conduit leading from one of said arms to the atmosphere.

15. A brooder, comprising a casing, and a hollow member movable vertically therein and in its upper position acting as a heater, said member in its lowest position acting as a ventilator and division wall, supports carried by said member, and removable hovers carried by said supports.

In testimony whereof, I have hereunto set my hand.

JOHN FRANKLIN CARY.

Witnesses:
 ELBERT L. HYDE,
 GLENN H. LERESCHE.

Copies of this patent may be obtained for five cents each, by addressing the "Commissioner of Patents, Washington, D. C."